United States Patent [19]

Buirley et al.

[11] Patent Number: 4,676,617
[45] Date of Patent: Jun. 30, 1987

[54] CAMERA SYSTEM AND POWER SUPPLY

[75] Inventors: William L. Buirley, Centerville; Donald E. Koopman; David B. McQuain, both of Dayton, all of Ohio

[73] Assignee: Med-Tech Products, Inc., Dayton, Ohio

[21] Appl. No.: 738,823

[22] Filed: May 29, 1985

[51] Int. Cl.$^4$ .................... G03B 29/00; G03B 17/50; G03B 15/02
[52] U.S. Cl. ........................................ 354/76; 354/86; 354/145.1
[58] Field of Search ............... 116/207; 354/62, 76, 354/145.1, 86, 276

[56] References Cited

U.S. PATENT DOCUMENTS

| | | | |
|---|---|---|---|
| 2,006,007 | 6/1935 | Zimmer | 354/62 |
| 3,298,294 | 1/1967 | Manning | 354/62 |
| 3,388,645 | 6/1968 | Sullivan | 354/62 |
| 3,638,549 | 2/1972 | Suzuki | 354/165 |
| 3,869,604 | 3/1975 | Prochnow | 354/145.1 X |
| 3,988,755 | 10/1976 | Vogel | 354/202 X |
| 4,041,514 | 8/1977 | Johnson | 354/288 |
| 4,075,643 | 2/1978 | Lane | 354/86 |
| 4,091,400 | 5/1978 | Land | 354/202 |
| 4,172,647 | 10/1979 | Gold | 354/86 |
| 4,239,365 | 12/1980 | Norris | 354/288 X |
| 4,433,637 | 2/1984 | Buirley et al. | 116/207 |
| 4,510,419 | 4/1985 | Takematsu | 354/145.1 X |

FOREIGN PATENT DOCUMENTS 2920787  11/1979  Fed. Rep. of Germany ...... 354/288

Primary Examiner—Donald A. Griffin
Attorney, Agent, or Firm—Knobbe, Martens, Olson & Bear

[57] ABSTRACT

A photographic system is disclosed, including a camera adapted to photograph a flexible liquid crystal display screen for indicating the skin temperature of a patient, an electronic flash associated with the camera, means on the camera for receiving a fresh film pack containing a first battery, means for receiving a used film pack containing a second battery, means for powering the camera from the first battery, and means for powering the flash from the second battery. The means for receiving a battery-containing used film pack may also be used to power other photographic accessories.

11 Claims, 3 Drawing Figures

CAMERA SYSTEM AND POWER SUPPLY

BACKGROUND OF THE INVENTION

This invention relates to camera and flash systems, and particularly to a means for powering such systems for use with liquid crystal thermography.

In the field of instant photography, some cameras are powered by a battery contained in the film pack itself. One example of such cameras are those manufactured by Polaroid Corporation.

The battery-containing film packages include those sold under the designation 600 by Polaroid Corporation. The battery powers the electric film transport, the camera shutter, any autofocusing circuitry in the camera, and the built-in flash unit of the camera. Such film packs typically include film for ten instant pictures.

Medical thermography involves the process of measuring the temperature of a patient's skin. Cold spots can indicate areas of decreased circulation, while hot spots may indicate inflammation, injury, or cancer. Liquid crystal displays have been particularly useful in medical thermography. Such displays typically include a color-changing liquid crystal material that is sensitive to skin temperature variations of fractions of a degree centigrade. The display is preferably a flexible sheet that may be placed in contact with a patient's skin. By noting the color patterns on the opposite side, a physician may determine the skin temperature at various places on the patient's body.

Because the colored liquid crystal pattern indicating the skin temperature of the patient is transitory in nature, and disappears when the apparatus is removed from the direct contact with the patient's skin, it is desirable to provide a permanent record of the pattern generated by the liquid crystal screen. One appropriate method for generating such a pattern is by photography. Because of the environment in which this diagnostic procedure takes place, and because of the light refracting properties of the liquid crystal display, it is generally necessary to provide artificial lighting, such as an electronic flash, when taking a picture of the liquid crystal display screen. The electronic flash units are typically powered by household alternating current or by a separate battery pack, both of which decrease the portability of the unit and render its use less than convenient.

SUMMARY OF THE INVENTION

The present invention provides a photography system that is well suited for use with thermography, or with any application in which a film package is used that contains a battery for powering the camera and flash. With the present system, no separate power supply is needed for the one or more flash units associated with the camera. In addition, the present invention taps the unused capability of the battery remaining in the film pack after the film has been used.

In accordance with one aspect of the present invention, there is provided a photographic system, including a camera, an electronic flash or other accessory associated with the camera, means on the camera for receiving a fresh film pack containing a first battery, means associated with the camera for receiving a used film pack containing a second battery, means for powering the camera from the first battery, and means for powering the flash or accessory from the second battery. It is preferred that the second battery in the used film pack be connected in parallel with the first battery in the fresh film pack in order to provide increased current capability and a shorter recycling time for the electronic flash units. In accordance with this aspect of the invention, both batteries would power the camera and the flash.

In accordance with another aspect of the present invention, there is provided a system for performing and recording the results of medical thermography using a temperature-indicating liquid crystal display. This system comprises a flexible liquid crystal display screen for indicating the skin temperature of a patient, a frame supporting the screen, a camera on the frame spaced a predetermined distance from the screen and adapted to photograph the screen, at least one electronic flash mounted on the frame, a mirror on the frame with the camera and the mirror situated so that, when the flash is triggered, the light from the flash is reflected off of the mirror and onto the screen, means on the camera for receiving a fresh film pack containing a first battery, means associated with the camera for receiving a used film pack containing a second battery, and means for directing power from the first battery and the second battery to the flash and to the camera to provide power to them.

Thus, the present invention has utility both in the specific field of medical thermography, and in the more general field of photography using cameras that receive their power from a battery in the film pack.

DETAILED DESCRIPTION OF THE PREFERRED EMBODIMENTS

Figure 1:
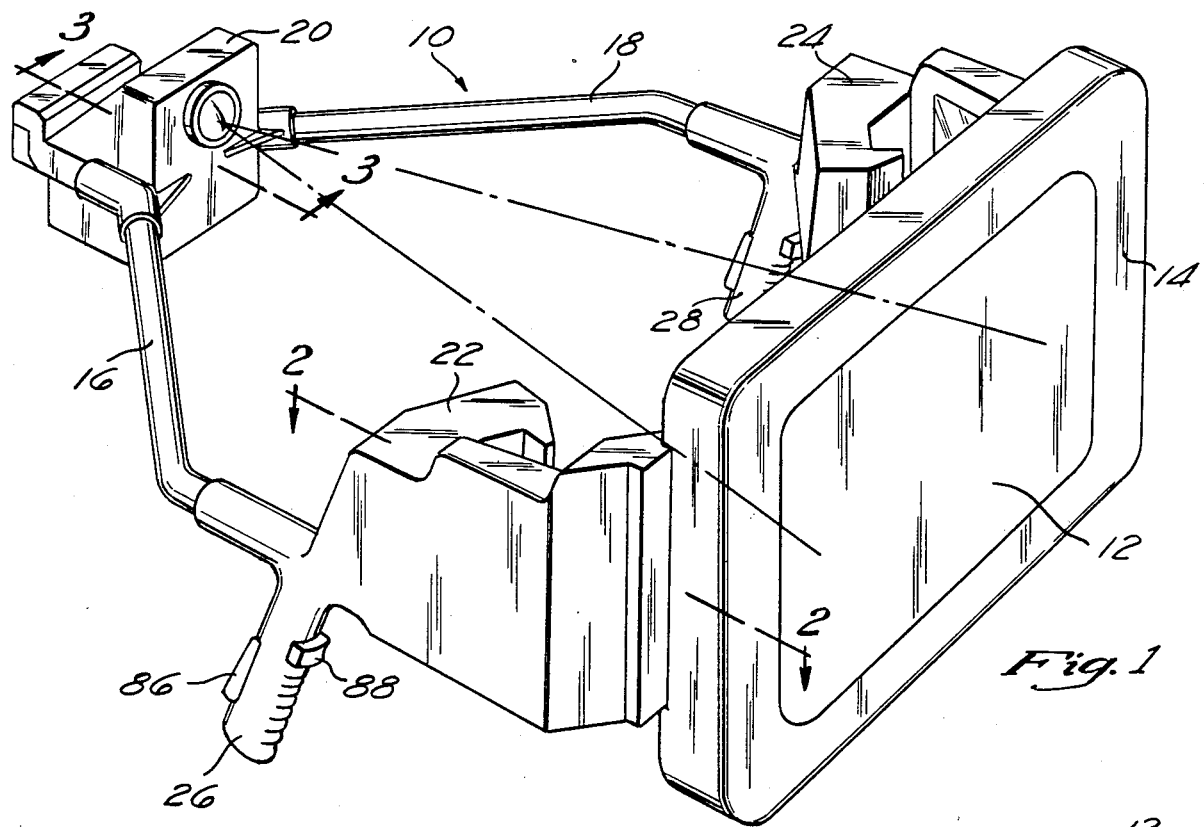
FIG. 1 is a perspective view of a system according to the present invention, including a liquid crystal thermography screen, a pair of electronic flashes, and a camera.

The medical thermography system 10 is shown in perspective in FIG. 1. This system includes a flexible liquid crystal display screen 12 in a generally rectangular frame 14. The liquid crystal display screen may be any type of screen suitable for visually displaying the temperatures of a surface brought in contact with the screen, such as human skin. Suitable screens and thermographic cholesteric coating materials are disclosed, for example, in U.S. Pat. Nos. 4,441,508; 4,433,637; and 4,301,054, all to Buirley, et al. Such screens can indicate temperature differences of fractions of a degree Centigrade. The color of the screen in any given area corresponds to the temperature of the surface against which that portion of the screen is placed.

Connected to either side of the frame 14 are arms 16 and 18. When the frame 14 is situated vertically, the arms 16 and 18 extend horizontally from the frame 14 and the screen 12. On the opposite end of the arms 16, 18 from the screen 12 and the frame 14, there is a camera 20. The camera 20, being mounted a fixed distance from the screen 12, may be a fixed focal length camera, thereby insuring that all pictures of the screen 12 at which it is directed are in focus. The camera 20 faces the side of the screen 12 on which the thermographic pattern is displayed. Also supported on the arms 16, 18 are a pair of electronic flash units 22 and 24, respectively. Roughly midway along the length of the arms 16, 18 are a pair of downwardly-extending handles 26, 28, located approximately at the balance point or center of gravity of the entire system 10.

Figure 2:
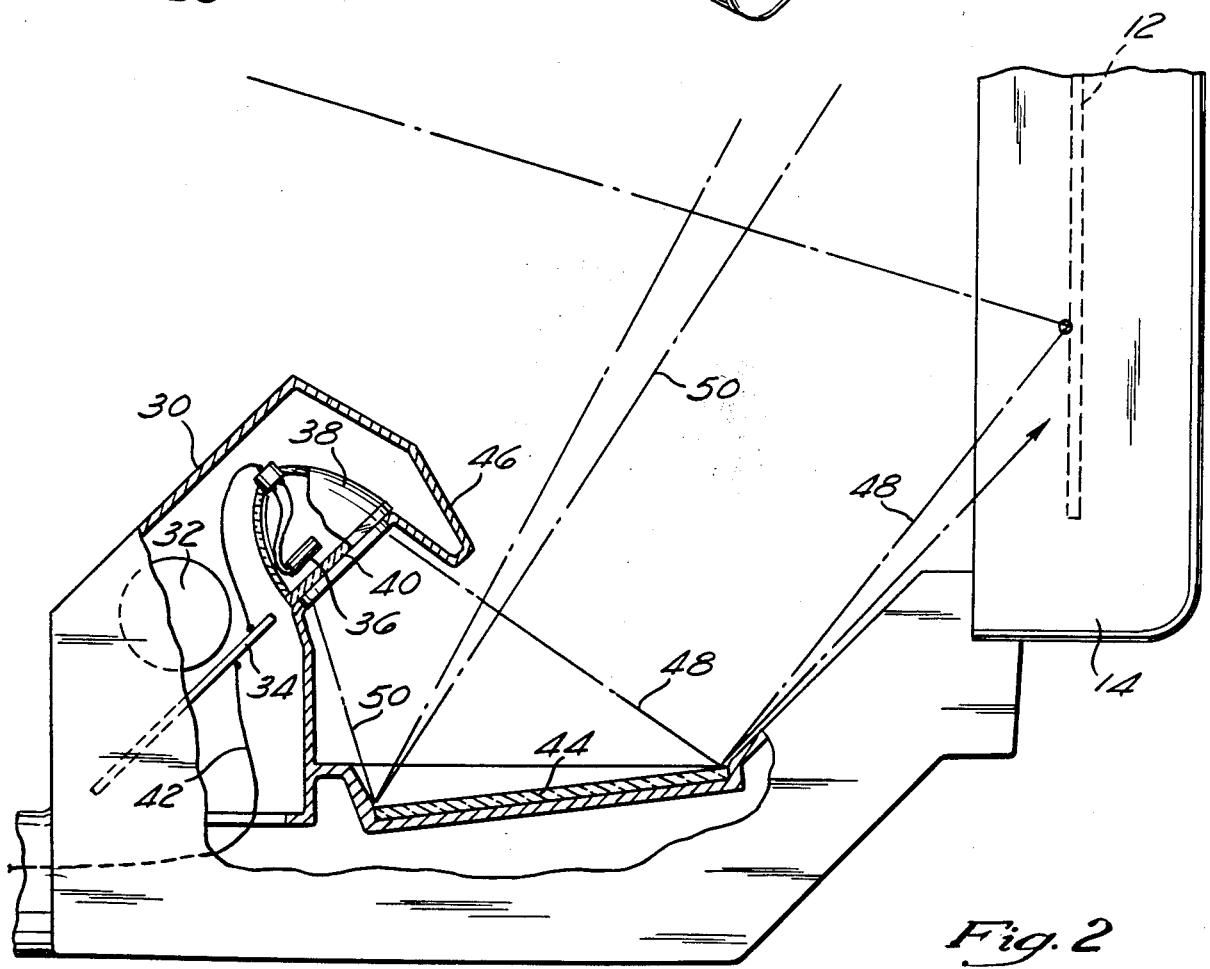
FIG. 2 is a partially cut-away plan view of the flash unit of the present invention with a section taken along the line 2—2 in FIG. 1.

The flash units 22, 24 are shown in partial cross-section in FIG. 2. The flash assembly includes a housing 30 which contains a photoflash capacitor 32, a printed circuit board 34, and a flash tube 36 inside a reflector 38 having a lens 40. Wiring 42 supplies power to the capacitor 32 and the printed circuit board 34, and triggers conventional circuitry on the printed circuit board 34 to discharge the capacitor 32 through the flash tube 36 when a picture is taken.

When the flash is triggered, the light from the flash is directed off of a mirror 44 and onto the liquid crystal display screen 12. The flashes 22, 24 are directed angularly away from the screen 12, and a forwardly-extending portion 46 of the housing 30 prevents light from the flash tube 36 from impinging directly on the screen 12. The lines 48, 50 indicate the path of the light from the flash 22 to the part of the screen 12 seen by the camera 20. The illuminated area of the screen 12 is preferably slightly larger than the field of view of the camera 20. Also, with a flash on either side of the screen 12, symmetrical lighting and even illumination are achieved. The use of such mirrors permits the light path from the flashes 22, 24 to be folded, thus providing a more compact apparatus.

The mirror 44 may optionally include a means for altering one or more spectral components of the light. For example, where the mirror is "silvered" with gold, a more natural-colored light results that is spectrally more suitable for use with the liquid crystal display screen 12. Alternatively, any other desired spectral component may be filtered and/or removed by providing a mirror having the desired absorptive and reflective characteristics.

Figure 3:
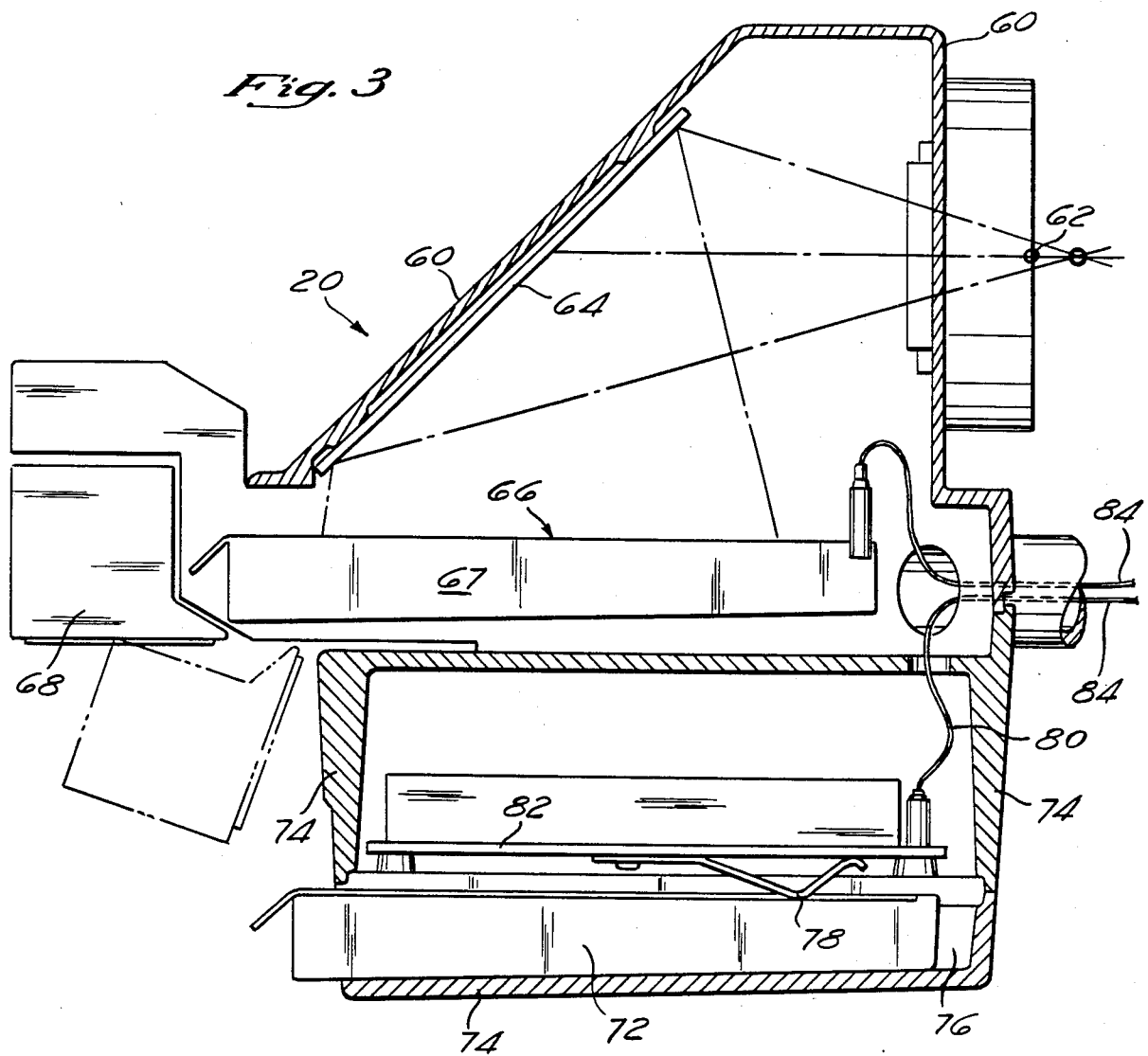
FIG. 3 is a section of the camera in FIG. 1 taken along the line 3—3.

The construction of the camera 20 is illustrated more fully in FIG. 3. The camera 20 includes a housing 60 and a lens 62. Light entering the camera is reflected off of a mirror 64 and down onto the film 66.

The portion of the camera 20 that receives the film 66 may advantageously be a Polaroid CB72 film pack.

The film 66 in the camera 20 is in a fresh film pack 67 located on the focal plane of the camera. The film pack 67 contains a battery (not shown). Such film is marketed, for example, by Polaroid Corporation under the trade designation "600" and "779". The film pack 67 is inserted into and removed from the camera 20 by means of a gate 68. The gate 68 is shown in the closed position in FIG. 3, with the open position shown in phantom. When the film pack 67 is removed through the film gate 68, the battery in the film pack, which has been used to power the camera 20, is not fully exhausted. Indeed, when the battery is used to power the camera and a single flash, more than 50% of the battery's charge may remain when the empty film pack 72 is removed from the camera 20.

Accordingly, the camera of the present invention is provided with an empty film pack housing 74 including a compartment 76 into which the empty film pack 72 may be inserted. The compartment 76 is removed from the focal plane of the camera 20. The empty film pack housing 74 is associated with the camera 20, and may actually be attached to the camera 20. Alternatively, it may be a separate device, or it may be attached to an electronic flash or other photographic accessory. A pair of electrical contacts 78 (only one of which is shown in FIG. 3) are provided in the compartment 76 to make contact with the battery in the empty film pack 72. Wiring 80 joins the battery in the empty film pack 76 in parallel with the battery in the fresh film pack. A printed circuit board 82 may optionally be provided in the empty film pack housing 74 to monitor and display the charge on the battery in the film packs 67, 72 and to interface with the electronics in the remainder of the camera 20, as desired.

The batteries in the fresh film pack 67 and in the empty film pack 72 together supply power to the electronic flashes 22, 24 by means of wire leads 84, as well as to the camera 20. The wires 84 run through the arms 16, 18 and connect with the printed circuit board 34 and wiring 42 in the electronic flash.

The arms 16, 18 are preferably of molded polymer material or of lightweight, tubular metal, such as aluminum. Tubular construction provides a convenient means for routing the wiring from the handle 26 and the flashes 22, 24 to the camera 20.

In use, the apparatus of the present invention is grasped by the handles 26, 28, and the liquid crystal display screen 12 is placed against the skin of a patient. An electrical switch 86 on the handle 26 is depressed to supply power to the camera and to the electronic flash units 22, 24. When the desired thermographic pattern is present on the screen 12, a trigger 88 on the handle 26 is depressed. The trigger 88 is either electrically or mechanically (as by a cable release) connected to the camera 20, and triggers the camera 20, which in turn triggers the electronic flashes 22, 24. The light from the flashes is reflected off of the mirror 44 to illuminate the screen 12 while it is photographed by the camera 20.

Of course, the present invention is not limited strictly to photographic systems for use with medical thermography. The concept of utilizing the battery in an empty film pack as a back up or supplemental power supply has application in a wide range of photographic systems.

This invention is particularly useful where short flash recycling times are necessary, where large current drains are to be expected, and where either more than one flash or a relatively large flash is used. In situations where more voltage is necessary, the two batteries may be connected in series, rather than in parallel. The invention also contemplates using the battery in the fresh film pack to power the camera, and using the battery in the exhausted film pack to power the flash. Of course, the empty film pack housing may be directly attached to the camera, as shown in FIG. 3, or it may be attached to a separate flash unit or other photographic accessory that is not a part of the camera body. The disclosed system has application in connection with any photographic accessory used with a camera that receives its power from a battery in a film pack, and the invention is broad enough to cover a separate photographic accessory with means for receiving a used film pack and means for powering the accessory from the battery in the used film pack. In addition to such accessories as flashes and motor drives, the system may also be used to power such accessories as light meters, microcircuitry, and digital or graphic LCD or LED displays.

What is claimed is:

1. A system for performing medical thermography and recording the results thereof, comprising:

a flexible liquid crystal display screen for indicating the skin temperature of a patient;
a frame supporting said screen;
a camera on said frame spaced a predetermined distance from said screen and adapted to photograph said screen;
a first electronic flash mounted on said frame;
a mirror on said frame, said camera and said mirror situated so that, when said flash is triggered, the light from said flash is reflected off of said mirror and onto said screen;
means on said camera for receiving a fresh film pack containing a first battery;
means associated with said camera for receiving a used film pack containing a second battery; and
means for directing power from said first battery and said second battery to said flash and to said camera for providing power thereto.

2. The system of claim 1, wherein said means for receiving a fresh film pack is located directly over said means for receiving a used film pack, so that a film pack may be inserted into each of said receiving means in the same direction.

3. The system of claim 2, further comprising:
a second electronic flash mounted on said frame, said first flash and said second flash situated on opposite sides of said display screen and angled away from said display screen; and
a mirror associated with said first flash and a mirror associated with said second flash, said mirrors being adapted to reflect light from said flash onto said screen.

4. A photographic system, comprising:
a camera;
an electronic flash associated with said camera;
an unused film pack having unexposed film therein and containing a first disposable battery;
a used film pack having no film therein and containing a second disposable battery;
means on said camera for releasably receiving said unused film pack;
means for releasably receiving said used film pack;
means for powering said camera from said first battery; and
means for powering said flash from said second battery, whereby said first and second batteries contained in said film packs are used as the sole power supply for said photographic system.

5. The system of claim 4, wherein said first battery and said second battery are connected in parallel to power both said camera and said electronic flash.

6. The system of claim 4, wherein said first battery and said second battery are connected in series.

7. The system of claim 4, further comprising a second electronic flash associated with said camera, and means for powering said second flash from said second battery.

8. The system of claim 4, wherein said means for receiving a used film pack is attached to said camera.

9. The system of claim 4, wherein said means for receiving a used film pack is not attached to said camera.

10. The system of claim 4 further comprising:
circuit means associated with said used film pack for sensing the magnitude of the charge of said first and second disposable batteries and for displaying said magnitude.

11. A system for recording data from a medical testing apparatus, said system comprising:
a display screen for indicating said data;
a frame attached to said screen;
a camera on said frame spaced a predetermined distance from said screen and adapted to photograph said screen;
a first electronic flash mounted on said frame for illuminating said screen;
means on said camera for receiving an unused film pack having unexposed film therein and containing a first battery;
means associated with said camera for receiving a used film pack having no film therein and containing a second battery; and
means for directing power from said first battery and said second battery to said flash and to said camera for providing power thereto.

* * * * *